United States Patent [19]

Sghibartz

[11] 4,407,997

[45] Oct. 4, 1983

[54] MARINE PAINT

[75] Inventor: Cristian M. Sghibartz, Washington, England

[73] Assignee: The International Paint Company Limited, London, England

[21] Appl. No.: 313,290

[22] Filed: Oct. 21, 1981

[30] Foreign Application Priority Data

Oct. 30, 1980 [GB] United Kingdom ............... 8034798

[51] Int. Cl.$^3$ .............................................. C08L 31/02
[52] U.S. Cl. ................................... 524/202; 524/208; 524/413; 524/432; 524/560; 524/561
[58] Field of Search ............... 524/208, 202, 431, 560, 524/561, 413, 432; 106/18.33, 15.05

[56] References Cited

U.S. PATENT DOCUMENTS

| | | | |
|---|---|---|---|
| 4,021,392 | 5/1977 | Milne et al. | 260/28.5 A |
| 4,139,515 | 2/1979 | Dennington | 260/29.6 MM |
| 4,187,211 | 2/1980 | Robinson et al. | 206/42.44 |
| 4,191,579 | 3/1980 | Hails et al. | 106/15 R |
| 4,260,535 | 4/1981 | Russell | 524/561 |

FOREIGN PATENT DOCUMENTS

| | | | |
|---|---|---|---|
| 52-32928 | 3/1977 | Japan | 524/560 |
| 1062324 | 3/1967 | United Kingdom | . |
| 1408327 | 10/1975 | United Kingdom | . |
| 1457590 | 12/1976 | United Kingdom | . |
| 2007235 | 10/1978 | United Kingdom | . |

*Primary Examiner*—Lewis T. Jacobs
*Attorney, Agent, or Firm*—Steel, Gould & Fried

[57] ABSTRACT

A marine paint capable of becoming smoother in relatively moving sea water and having no or a low content of organotin comprises a film-forming acrylic polymer and a metalliferous pigment which is sparingly soluble in seawater. The acrylic polymer comprises 20–100 percent by weight of monomer units (A) selected from methyl acrylate and ethyl acrylate units, 0–45 percent by weight of monomer units (B) of a triorganotin salt of an olefinically unsaturated carboxylic acid and 0–80 percent by weight of monomer units (C) which are alkyl methacrylate units having 1–4 carbon atoms in the alkyl group or styrene units. Monomer units (A), (B) and (C) form at least 80 percent by weight of the acrylic polymer; the balance of the polymer if any comprises units of at least one other olefinically unsaturated comonomer.

10 Claims, No Drawings

MARINE PAINT

This invention relates to marine anti-fouling paints generally used as top-coat paints for ships' hulls.

The growth of marine organisms on the sub-marine parts of a ship's hull increases the frictional resistance of the hull to passage through water, leading to increased fuel consumption and/or a reduction in the speed of the ship. Marine growths accumulate so rapdily that the remedy of cleaning and repainting as required is impractical. In general the extent of fouling is limited by applying to the hull a top-coat incorporating anti-fouling agents. The anti-fouling agents are biocides which are freed from the surface of the paint over a period in concentrations lethal to marine organisms on the hull's surface. The anti-fouling paint fails only when the concentration of biocide available at the paint surface falls below the lethal concentration, and with marine paints up to two years' useful life can be expected. The better anti-fouling paints are thus effective in dealing with gross infestation of hulls for considerable periods but a top coat paint of a ship's sub-marine surface has irregularities from its method of application and is furthermore subject to break-down and delamination during service, increasing the roughness of the hull, so that the performance of the ship falls off even when fouling is prevented.

My British patent specification No. 1,457,590 describes and claims a paint based on a film-forming copolymer containing units of a triorganotin salt of an olefinically unsaturated carboxylic acid. Upon contact with seawater it loses triorganotin ions by ion exchange with seawater. This generates a water-soluble resin which essentially is a copolymer salt formed as a result of the depletion in the copolymer organotin content and exchange with metal ions present in seawater. This gradual dissolution of the copolymer means that a fresh anti-fouling paint surface is continuously revealed, prolonging the time for which biocide release at the paint surface is maintained above the lethal concentration.

The paint of British patent specification No. 1,457,590 has the remarkable property that relatively moving seawater smooths the surface of the paint, removing excrescences composed of the paint. When it is painted on a ship, the painted sub-marine surface of the ship at least preserves its initial smoothness and may become smoother during the ordinary traffic of the ship, leading to improved efficiency. The smoothing of the paint is inevitably accompanied by the release of the triorganotin ions into the surrounding seawater. In most circumstances, this is useful because the triorganotin ions are effective anti-fouling agents. However, triorganotin compounds are both expensive and strongly biocidal and it would be desirable in many circumstances to reduce the usage of triorganotin groups or avoid them altogether while obtaining the benefits of the smoothing of the paint in service.

We have now found surprisingly that certain polymers of more simple acrylate esters can be used as the basis of marine paints which are gradually planed away as a ship moves through seawater.

A marine paint according to the present invention comprises a film-forming acrylic polymer and a metalliferous pigment which is sparingly soluble in seawater. The acrylic polymer comprises 20 to 100 percent by weight of monomer units (A) selected from methyl acrylate and ethyl acrylate units, 0 to 45 percent by weight of monomer units (B) of a triorganotin salt of an olefinically unsaturated carboxylic acid, and 0 to 80 percent by weight of units (C) which are alkyl methacrylate units having 1 to 4 carbons in the alkyl group or styrene units, monomer units (A) and (B) and (C) forming at least 80 percent by weight of the polymer and the balance of the polymer, if any, being units of at least one other olefinically unsaturated comonomer.

The film-forming polymers used in the present invention are slowly hydrolysed in seawater so that they are gradually removed by motion through seawater. No inactive layer develops at the surface of the paint, and the paint at least maintains its initial smoothness in the manner shown in FIGS. 2A to 2D of British patent specification No. 1,457,590.

In a preferred form of the invention the monomer units (A) form 30 to 100 percent by weight of the acrylic polymer and the monomer units (A) and monomer units (C) together form at least 90 percent, for example 100 percent, by weight of the polymer. Such film-forming polymers which are free from monomer units (B) do not release biocidal groups into the seawater and should be used in conjunction with a biocide for marine fouling organisms. This can be chosen for the particular waters which the ship is likely to encounter. The biocide can be in the form of a sparingly soluble metalliferous pigment such as cuprous oxide or an organic biocide can be used in the paint.

The polymer preferably contains at least 10 percent by weight of the monomer units (C) since such polymers form stronger films. The $C_{1-4}$ alkyl methacrylate units are preferred, particularly methyl methacrylate units. The olefinically unsaturated comonomer, if used, can be an acrylic monomer, for example propyl acrylate, amyl acrylate, hexyl acrylate, butyl acrylate, hexyl methacrylate, acrylonitrile or methacrylonitrile, or a vinyl monomer, for example vinyl acetate, vinyl propionate, vinyl butyrate, vinyl chloride or vinyl pyridine. The polymer can contain monomer units conferring increased water reactivity, particularly when the polymer contains a relatively high proportion of monomer units (C), which tend to inhibit dissolution of the polymer. For example the polymer can contain up to 20 percent by weight of maleic or itaconic anhydride, acrylamide, methacrylamide or N-vinyl pyrrolidone units or up to 5 percent by weight, preferably 2 percent or less, of acrylic, methacrylic or itaconic acid units. Care must be taken to avoid gelation of the paint when using a copolymer containing free acid monomer units.

The paint of the invention can be one which releases biocidal triorganotin ions by hydrolysis from a polymer and is smoothed by passage through seawater, but which is more economical in the use of triorganotin. In this case the film-forming acrylic polymer preferably comprises 20–70 percent by weight of monomer units (A), up to 45 percent by weight, for example 10–45 percent, of monomer units (B) and 20–50 percent by weight of monomer units (C). The monomer units (B) are preferably of the formula $R_3SnOOCCR'=CHR''$ where each R is an alkyl radical containing 2 to 8 carbon atoms or an aryl or aralkyl radical, R' is H or $CH_3$ and R'' is H or $-COOSnR_3$. The groups R attached to the tin atom can be different but are preferably the same, for example $R_3Sn$ can be tributyl tin, tripropyl tin, tribenzyl tin, triphenyl tin, tritolyl tin or trihexyl tin. The carboxylate group $-OOCCR'=CHR''$ is preferably acrylate, methacrylate or maleate.

The film-forming polymer can be prepared by addition polymerisation of the appropriate monomers in the appropriate proportions at polymerisation conditions using a free radical catalyst such as benzoyl peroxide or azobisisobutyronitrile in an organic solvent such as xylene, toluene, butyl acetate, n-butanol, 2-ethoxyethanol, cyclohexanone, 2-methoxyethanol, 2-butoxyethanol and/or 2-ethoxyethyl acetate. Polymerisation is preferably at a temperature in the range 70°–100° C. Within this range the use of higher temperatures produces polymers of lower molecular weight. Polymerisation may be carried out by heating all the polymer ingredients in the solvent at the required temperature or by gradually adding a mixture of the monomers and catalyst to treated solvent. The latter procedure produces polymers of lower molecular weight. A chain transfer agent such as a mercaptan can also be used to produce polymers of lower molecular weight. For a given proportion of monomers the paint tends to dissolve in and become smoothed by relatively moving sea water more rapidly if the polymer has a lower molecular weight, and such polymers may be preferred when using a high proportion of monomer units (C), particularly if monomer units (C) comprise styrene. Mixtures of polymers of different composition, or of higher and lower molecular weight polymers, can be used.

Alternatively the paint can be an aqueous emulsion paint based on a film-forming acrylic polymer prepared by emulsion polymerisation. In this case the monomers are preferably chosen so that the polymer has a glass transition temperature of 5°–25° C. Emulsion copolymers preferably include no more than 40 percent by weight of monomer units (C).

The metalliferous pigment sparingly soluble in seawater is exemplified by cuprous thiocyanate, cuprous oxide, zinc oxide, cupric acetate meta-arsenate, zinc chromate, zinc dimethyl dithiocarbamate and zinc diethyl dithiocarbamate. The paint preferably includes a least one metalliferous pigment selected from zinc oxide, cuprous oxide and cuprous thiocyanate and pigments whose seawater solubility is similar to theirs. These pigments have a seawater solubility such that the pigment particles do not survive at the paint surface. The pigment has the effect of inducing the overall smoothing which the relatively-moving seawater exerts on the paint film, minimising localised erosion and preferentially removing excrescences formed during the application of the paint. Mixtures of sparingly soluble pigments can be used, for example zinc oxide which is most effective at inducing the gradual dissolution of the paint, can be mixed with cuprous oxide, cuprous thiocyanate or zinc dimethyl dithiocarbamate which are more effective marine biocides.

Such mixtures preferably comprise up to 75 percent by volume zinc oxide and 25–100 percent by volume cuprous oxide or cuprous thiocyanate. Zinc dimethyl dithiocarbamate and zinc diethyl dithiocarbamate are somewhat less soluble than cuprous oxide or thiocyanate. If used, they preferably form up to 75 percent by volume of the pigment, with at least 25 percent by volume of the pigment being zinc oxide.

The paint composition can additionally contain a pigment which is highly insoluble in seawater, such as titanium dioxide or ferric oxide. Such highly insoluble pigments can be used at up to 40 percent by weight of the total pigment component of the paint. The highly insoluble pigment has the effect of retarding the dissolution of the paint.

The proportion of pigment to polymer is generally such as to give a pigment volume concentration of at least 25 percent, preferably at least 35 percent, in the dry paint film. The upper limit of pigment concentration is the critical pigment volume concentration. Paints of pigment volume concentration about 50 percent, for example, have been found very effective for smoothing in seawater and preventing fouling.

Paints according to the invention may include a plasticiser although this is not usually necessary. Examples of plasticisers are tritolyl phosphate, diisooctyl phthalate, tributyl phosphate, butyl benzyl phthalate, dibutyl tartrate, 'Lutenal A25' polyether and hydrophobic organic plasticisers which retard the rate of dissolution of the paint, such as chlorinated diphenyl, for example Aroclor 1254 sold by Monsanto Ltd., chlorinated paraffin wax, for example Cereclor 48 and Cereclor 70 sold by I.C.I. Ltd., diphenyl ether, dichloro-diphenyl-trichloroethane or low-molecular weight polybutenes such as Hyvis 05 sold by B.P. Ltd.

Many of the metalliferous pigments sparingly soluble in seawater have biocidal activity, particularly copper compounds such as cuprous thiocyanate, cupric acetate meta-arsenate and cuprous oxide, and also zinc oxide to a lesser extent. Even when the polymer contains no triorganotin salt units (B) the biocidal effect of these sparingly soluble pigments, particularly cuprous oxide, may be sufficient so that the paint needs no further biocide, for example for use on the flat bottom of very large tankers, where fouling is less likely to occur. We believe that the self-smoothing action of the paint increases its resistance to fouling compared to a conventional paint releasing biocide at the same rate; this effect is more marked with increasing rate of dissolution of the paint, as for example when the film-forming polymer contains a high proportion of methyl or ethyl acrylate and the sparingly soluble pigment includes zinc oxide.

The paint can contain an added biocide effective against seaweed and barnacles. Triorganotin salts and oxides such as triphenyltin fluoride, tributyl tin fluoride, tributyl tin dibromosuccinate, triphenyltin chloride, triphenyltin hydroxide and tributyltin oxide are effective marine biocides and can be used in paints according to the invention, particularly where the polymer contains no monomer units (B). A paint according to the invention comprising a tin-free polymer, a pigment such as cuprous oxide and a small proportion of a triorganotin salt (up to 25 percent by volume based on the pigment) may have antifouling and smoothing properties equal to an organotin copolymer paint of much higher total organotin content. Alternatively a mixture of organotin-free and organotin polymers can be used.

In some cases it will be desired to avoid completely the release of triorganotin ions. Examples of other biocides effective as antifouling agents are di-thiocarbamate derivatives such as cuprous ethylene bis-di-thiocarbamate or 2-(N,N-dimethyl thiocarbamyl thio)-5-nitro thiazole, substituted isothiazolones particularly halogenated N-substituted isothiazolones, tetramethyl thiuram disulphide and dichlorodiphenyltrichloroethane (which also acts as a hydrophobic organic retarder).

The invention is illustrated by the following Examples:

EXAMPLE 1

Methyl methacrylate (7.6 g; 0.076 mole) and methyl acrylate (68.4 g; 0.795 mole) were dissolved in a mixture of xylene (85.4 g) and cyclohexanone (36.6 g). Azobisisobutyronitrile (AIBN) (2.0 g; 0.012 mole) was added and the solution was heated to 80° C. The polymerisation reaction was conducted (with stirring) at this temperature. There was an exotherm in the first 20 minutes of the reaction. The course of the polymerisation was followed by monitoring the change in the refractive index. No further significant change was observed after 3 hours and the solution was then heated to 100° C. for a period of 30 minutes to destroy any residual activity of AIBN.

The product was a 36.0 percent by volume solids solution of a copolymer of 10 percent by weight methyl methacrylate and 90 percent by weight methyl acrylate.

88.7 g of the copolymer solution produced above was mixed with cuprous oxide (71.5 g) and Aerosil colloidal silica (1.3 g) and milled overnight to produce a paint of pigment volume concentration 35 percent.

EXAMPLE 2

88.7 g of the copolymer solution produced as in Example 1 was mixed with cuprous thiocyanate (35.2 g) and Aerosil colloidal silica (1.3 g) and milled overnight.

EXAMPLE 3

88.7 g of the copolymer solution produced as in Example 1 was mixed with zinc oxide (33.8 g), cuprous oxide (35.7 g) and Aerosil colloidal silica (1.3 g) and milled overnight. The paint contained $ZnO:Cu_2O$ in 50:50 ratio by volume.

EXAMPLE 4

88.7 g copolymer solution produced as in Example 1 was mixed with zinc oxide (50.7 g), cuprous oxide (17.9 g) and Aerosil colloidal silica (1.3 g) and milled overnight. The paint contained $ZnO:Cu_2O$ in 75:25 ratio, by volume.

The smoothing performance of paints in relatively moving seawater can be tested in the apparatus described in British Patent Specification No. 1,457,590 with reference to FIGS. 7A and 7B. A disc having a diameter of 23 cm is coated in radial stripes with the paints under test. The stripes are applied by a standardised applicator adapted to deposit a film $20\mu$ thick (wet thickness). The disc is immersed in flowing seawater and rotated at a peripheral speed of 33 knots.

During this test the paint films under test are planned away, eventually to the extent that the underlying substrate is revealed. There is always some variation in the thickness of the paint film within each stripe so that the stripe of paint does not suddenly vanish; an increasing proportion of the substrate is revealed over time. When the substrate is revealed over 50 percent of the area of the stripe it is a good approximation to say that the paint film in the stripe has lost by planing the original average dry thickness of the paint film in the stripe. The time in days to achieve this ("$D^{50}$") is a measure of the rate of planing of the paint in relatively moving seawater.

The surface of the paint film in each stripe should be examined during the test to note whther it is smooth and firm. Paint films according to the invention which at least retain their initial smoothness must be distinguished from paint films which are removed over at least a portion of the stripe by flaking or localised erosion causing roughening or by separation from the disc.

The above test can be used to give an absolute rate of planing of the paint film, but the temperature, composition and flow rate of the seawater can effect the result. The test is preferably used as a comparison in which one of the stripes painted on the disc is an antifouling paint known to have the desired rate of dissolution in relatively moving seawater.

A disc was prepared having 2 stripes each of the paints of Examples 1, 2 and 3, one stripe of the paint of Example 4, 2 stripes of a commercially successful self-polishing paint X and 2 stripes of paint Y comprising (by weight) 36.1 percent of a 40 percent by volume solution of a 60:40 tributyltin methacrylate/methyl methacrylate copolymer, 45.8 percent ZnO, 0.7 percent colloidal silica, 0.9 percent bentonite, 0.4 percent tributyltin oxide and 12.4 percent xylene. This paint is known from British Patent Specification No. 1,457,590 to be smoothed away during motion through seawater at a dissolution rate which is generally too fast for optimum commercial use, but which can be retarded to the optimum rate by a hydrophobic organic material.

All the paints were observed to be planed away during rotation in seawater.

The stripes of comparison paint X had an average $D^{50}$ of 15.5 days and those of comparison paint X had a $D^{50}$ of 3 days. The average $D^{50}$ of the paints of Examples 1, 2, 3 and 4 respectively were 17 days, 28 days, 9.5 days and 5.8 days. These results indicate that the paints of Examples 1, 2 and 3 have a rate of dissolution in relatively moving seawater which would be sufficient to give appreciable smoothing of the paint film but not too fast for commercial use. The paint of Example 4 dissolved somewhat faster than would be desired in commercial practice but slower than comparison paint Y, indicating that its dissolution could be retarded to a commercial rate by the addition of a minor amount of an organic hydrophobic retarder. All the rates of dissolution were compatible with the release of sufficient of an added biocide without forming a leached inactive outer layer of paint.

EXAMPLE 5

Methyl methacrylate (22.8 g; 0.228 mole) and methyl acrylate (53.2 g; 0.619 mole) were dissolved in xylene (122 g). AIBN (2.0 g; 0.012 mole) was added and the solution was heated to 80° C. The polymerisation reation was conducted (with stirring) at this temperature. There was a mild exotherm in the first 20 minutes of the reaction. The course of the polymerisation was followed by monitoring the change in the refractive index. No further significant change was observed after 4 hours and the solution was then heated to 100° C. for a period of 30 minutes to destroy any residual activity of AIBN. The product was a 37.6 percent by volume solids solution of a copolymer of 30 percent by weight methyl methacrylate and 70 percent by weight methyl acrylate.

84.4 g of the copolymer solution priduced above was mixed with cuprous oxide (71.5 g), Aerosil colloidal silica (1.3 g) and xylene (1.5 g) and milled overnight.

EXAMPLE 6

84.4 g of the copolymer solution produced as in Example 5 was mixed with zinc oxide (33.8 g), cuprous oxide (35.7 g), Aerosil colloidal silica (1.3 g) and xylene (1.5 g) and milled overnight. The product contained $ZnO:Cu_2O$ in 50:50 ratio, by volume.

EXAMPLE 7

Copolymer solution (84.4 g) produced as in Example 5 was mixed with zinc oxide (50.7 g), cuprous oxide (17.9 g), Aerosil colloidal silica (1.3 g) and xylene (1.5 g) and milled overnight. The paint contained ZnO:Cu$_2$O in 75:25 ratio, by volume.

EXAMPLE 8

A 36 percent by volume solids solution of poly(methyl acrylate) in a 70:30 mixture of xylene and cyclohexanone was prepared by the procedure of Example 1. This solution was milled with cuprous oxide and 0.8 percent by weight colloidal silica to form a paint having a pigment volume concentration of 35 percent and a solids content of 37 percent by volume.

EXAMPLES 9 AND 10

The poly(methyl acrylate) solution of Example 8 was milled with zinc oxide and cuprous oxide in differing proportions, and with 0.8 percent by weight colloidal silica in each case to form two paints, each having a pigment volume concentration of 35 percent and a solids content of 37 percent by volume. The paint of Example 9 had ZnO:Cu$_2$O ratio of 50:50 by volume and the paint of Example 10 had a ZnO:Cu$_2$O ratio of 75:25 by volume.

EXAMPLE 11

A 36 percent by volume solids solution in xylene of a copolymer of 70 percent by weight methyl methacrylate and 30 percent by weight methyl acrylate was prepared by the procedure of Example 5. This solution was milled with zinc oxide and cuprous oxide and 0.8 percent by weight colloidal silica to form a paint having a pigment volume concentration of 35 percent, a ZnO:Cu$_2$O ratio of 75:25 by volume and a solids content of 37 percent by volume.

The paints of Examples 5 to 11 were tested in the rotating disc test described above. A disc was prepared having 2 stripes each of the paints of Examples 5, 6, 7 and 9, one stripe each of the paints of Examples 8, 10 and 11 and 2 stripes each of comparison paints X and Y described above.

All the paints were observed to be planed away during rotation in seawater.

The stripes of comparison paint X had a D$^{50}$ of 12 days and those of comparison paint Y had a D$^{50}$ of 2 days. The average D$^{50}$ of the paints of Examples 5 to 11 were as follows:

| Example No. | D$^{50}$ (days) |
| --- | --- |
| 5 | 35 |
| 6 | 31 |
| 7 | 6.2 |
| 8 | 21 |
| 9 | 9 |
| 10 | 4.5 |
| 11 | 10.4 |

These results indicate that the paints of Examples 5, 6, 8, 9 and 11 have a rate of dissolution in relatively moving seawater which would be sufficient to give appreciable smoothing of the paint film but not too fast for commercial use. The paints of Examples 7 and 10 dissolved somewhat faster than would be desired in commercial practice but slower than comparison paint Y, indicating that their dissolution could be retarded to a commercial rate by the addition of a minor amount of an organic hydrophobic retarder. All the rates of dissolution were compatible with the release of sufficient of an added biocide without forming a leached inactive outer layer of paint.

EXAMPLE 12

A copolymer of 10 percent by weight methyl methacrylate and 90 percent by weight methyl acrylate was prepared by the process described in Example 1, using a 4:1 by weight mixture of xylene and 2-ethoxy-ethyl acetate as solvent to produce a 39.6 percent by volume solution. 124 g of this copolymer solution was mixed with 148 g cuprous oxide, 47 g zinc oxide, 3 g Aerosil colloidal silica, 5 g bentonite, 2 g n-butanol, 27 g xylene and 7 g 2-ethoxy-ethyl acetate to produce a paint of pigment volume concentration (P.V.C.) 50 percent and a ratio of cuprous oxide to zinc oxide of 75:25 by volume.

EXAMPLE 13

40 percent by weight methyl methacrylate and 60 percent by weight methyl acrylate were copolymerised in xylene using the procedure described in Example 5 to produce a 42.2 percent by volume copolymer solution. 146 g of this solution was mixed with 83 g cuprous oxide, 26 g zinc oxide, 7 g triphenyltin fluoride, 2 g Aerosil colloidal silica, 3 g bentonite, 1 g n-butanol and 22 g xylene to produce a paint of P.V.C. 35 percent.

EXAMPLE 14

10 percent by weight methyl methacrylate and 90 percent by weight ethyl acrylate were copolymerised in xylene using the procedure of Example 5 to produce a 39.6 percent by volume copolymer solution. 117 g of this copolymer solution was mixed with 198 g cuprous oxide, 3 g Aerosil colloidal silica, 5 g bentonite, 2 g n-butanol and 3.7 g xylene to produce a paint of P.V.C. 50 percent.

EXAMPLE 15

A paint was prepared as described in Example 14 except that 25 percent of the cuprous oxide was replaced by an equal volume (47 g) of zinc oxide.

EXAMPLE 16

70 percent by weight methyl methacrylate and 30 percent by weight ethyl acrylate were copolymerised in xylene using the procedure of Example 5 to produce a 43.9 percent by volume copolymer solution. 136 g of this copolymer solution was mixed with 28 g cuprous oxide, 79 g zinc oxide, 5 g tributyltin fluoride, 2 g Aerosil colloidal silica, 3 g bentonite, 1 g n-butanol and 30 g xylene to produce a paint of P.V.C. 35 percent.

EXAMPLE 17

195 g methyl acrylate was polymerised in 204 g xylene and 60 g 2-ethoxy-ethyl acetate using 5 g AIBN catalyst to produce a 39 percent by volume solution of poly(methyl acrylate). 127 g of this polymer solution was mixed with 148 g cuprous oxide, 47 g zinc oxide, 3 g Aerosil colloidal silica, 5 g bentonite, 23 g xylene, 6 g 2-ethoxy-ethyl acetate and 2 g n-butanol to produce a paint of P.V.C. 50 percent.

EXAMPLE 18

123 g of a 39.7 percent by volume solution in xylene of a copolymer of 30 percent by weight methyl methacrylate and 70 percent by weight methyl acrylate prepared as described in Example 5 was mixed with 148 g cuprous oxide, 47 g zinc oxide, 3 g Aerosil colloidal silica, 5 g bentonite, 31 g xylene and 2 g n-butanol to produce a paint of P.V.C. 50 percent.

EXAMPLE 19

189 g of the copolymer solution of Example 14 was mixed with 66 g zinc oxide, 20 g zinc dimethyl dithiocarbamate, 7 g tributyltin fluoride, 2.5 g Aerosil colloidal silica, 4 g bentonite, 19 g xylene and 1.5 g n-butanol to produce a paint of P.V.C. 35 percent.

EXAMPLE 20

240 g xylene was heated to 90° C. 14.8 g methyl methacrylate, 133.2 g methyl acrylate and 12 g AIBN were mixed and the mixture was gradually added to the hot xylene over 1.5 hours. A 38.2 percent by volume solution of a 10:90 by weight copolymer of methyl methacrylate:methyl acrylate was produced. 133 g of this copolymer solution was mixed with 148 g cuprous oxide, 47 g zinc oxide, 3 g Aerosil colloidal silica, 5 g bentonite, 23 g xylene and 2 g n-butanol to produce a paint of P.V.C. 50 percent.

EXAMPLE 21

Methyl methacrylate and methyl acrylate were copolymerised in xylene by the procedure of Example 5 to produce a 41.6 percent by volume solution of a 70:30 by weight methyl methacrylate:methyl acrylate copolymer. 141 g of this copolymer solution was mixed with 113.5 g curpous oxide, 4.5 g tributyltin oxide, 13 g titanium dioxide, 2.5 g Aerosil colloidal silica, 4.5 g bentonite, 1.5 g n-butanol and 20 g xylene to produce a paint of P.V.C. 35 percent.

EXAMPLE 22

158.5 g of the copolymer solution of Example 21 was mixed with 45 g cuprous thiocyanate, 2 g tributyltin oxide, 5.5 g titanium dioxide, 13 g talc, 1 g phthalocyanine blue, 2 g Aerosil colloidal silica, 2.5 g bentonite, 1.5 g n-butanol and 8 g xylene to produce a paint of P.V.C. 35 percent.

EXAMPLE 23

134.6g (69 percent by weight) methyl methacrylate, 58.5 g (30 percent by weight) methyl acrylate and 2.0 g (1 percent by weight) methacrylic acid were copolymerised at 80° C. for 3 hours in a mixture of 150 g xylene and 150 g cyclohexanone using 5 g AIBN catalyst to produce a 43.6 percent by volume copolymer solution. 140 g of the copolymer solution was mixed with 111 g cuprous oxide, 5.5 g tributyltin fluoride, 2 g Aerosil colloidal silica, 3.5 g bentonite, 1.5 g n-butanol, 15.5 g xylene and 15.5 g cyclohexanone to produce a paint of P.V.C. 35 percent.

EXAMPLES 24–26

Copolymers were prepared by the process of Example 23 using the proportions of monomers listed below:

| Example No. | Methyl methacrylate | Methyl acrylate | Methacrylic Acid |
|---|---|---|---|
| 24 | 132.6g (68 wt.%) | 58.5g (30 wt.%) | 3.9g (2 wt.%) |
| 25 | 76.1g (39 wt.%) | 117g (60 wt.%) | 2.0g (1 wt.%) |
| 26 | 17.6g (9 wt.%) | 175.5g (90 wt.%) | 2.0g (1 wt.%) |

Paints of P.V.C. 35 percent were produced from each of the copolymers using the same pigment and other ingredients as in Example 23.

EXAMPLE 27

300 g xylene was heated to 90° C. 161 g methyl acrylate was mixed with 29 g styrene and 10 g AIBN and added to the hot xylene over 1 hour. The mixture was held at 90° C. for a further hour to produce a 38.2 percent by volume solution of a 15:85 by weight styrene:methyl acrylate copolymer. 126 g of the copolymer solution was mixed with 42.5 g zinc oxide, 134.5 g cuprous oxide, 2.5 g Aerosil colloidal silica, 4.5 g bentonite, 33.5 g xylene and 1.5 g n-butanol to produce a paint of P.V.C. 50 percent.

EXAMPLE 28

76 g styrene and 114 g methyl acrylate were copolymerised using the procedure of Example 27 to produce a 35.8 percent by volume solution of a 40:60 by weight copolymer of styrene:methyl acrylate. 131 g of the copolymer solution was mixed with 42.5 g zinc oxide, 134.5 g cuprous oxide, 2.5 g Aerosil colloidal silica, 4.5 g bentonite, 24 g xylene and 1.5 g n-butanol to produce a paint of P.V.C. 50 percent.

EXAMPLE 29

171 g methyl acrylate and 19 g methacrylamide were copolymerised in 300 g cyclohexanone using 10 g AIBN catalyst under the procedure of Example 1 to produce a 42.1 percent by volume solution of a 90:10 by weight copolymer of methyl acrylate:methacrylamide. 136.5 g of the copolymer solution was mixed with 147.5 g cuprous oxide, 46.5 g zinc oxide, 3 g Aerosil colloidal silica, 5.5 g bentonite, 1.5 g n-butanol and 24 g cyclohexanone to produce a paint of P.V.C. 50 percent.

EXAMPLE 30

78 g methyl methacrylate, 39 g methyl acrylate and 78 g tributyltin methacrylate were copolymerised in 222 g xylene using 5 g AIBN and the procedure of Example 5 to produce a 39.2 percent by volume solution of a 40:20:40 by weight copolymer of methyl methacrylate:methyl acrylate:tributyltin methacrylate. 163 g of this copolymer solution was mixed with 66 g zinc oxide, 69.5 g cuprous oxide, 2 g Aerosil colloidal silica, 3.5 g bentonite, 1.3 g n-butanol and 7 g xylene to produce a paint of P.V.C. 35 percent.

EXAMPLE 31

226 g xylene was heated to 90° C. 74 g methyl methacrylate was mixed with 37 g methyl acrylate, 148 g of a 50 percent by weight solution of tributyltin methacrylate in xylene and 15 g AIBN and the mixture was added to the hot xylene over 1 hour to produce a 36.7 percent by volume solution of a copolymer having the same weight ratio of monomers as that of Example 30 but a lower molecular weight. 170.5 g of this copolymer solution was mixed with 66 g zinc oxide, 69.5 g cuprous oxide, 2 g Aerosil colloidal silica, 3.5 g bentonite, and 1.5 g n-butanol to produce a paint of P.V.C. 36.5 percent.

EXAMPLES 32–33

Using the procedure of Example 30 copolymer solutions were produced from the following monomers:

| Example No. | Methyl methacrylate | Methyl acrylate | Tributyltin methacrylate |
|---|---|---|---|
| 32 | 78g (40 wt.%) | 78g (40 wt.%) | 39g (20 wt.%) |
| 33 | 78g (40 wt.%) | 97.5g (50 wt.%) | 19.5g (10 wt.%) |

Paints of P.V.C. 35 percent were prepared from each of these copolymer solutions using the same pigment and other ingredients as in Example 30.

EXAMPLE 34

68 g methyl methacrylate, 34 g methyl acrylate and 68 g tributyltin methacrylate were copolymerised in 300 g xylene at 80° C. for three hours using 5 g AIBN catalyst and 25 g dodecyl mercaptan chain transfer agent to produce a 37.7 percent by volume solution of a copolymer having the same monomer weight ratio as that of Example 30 but with a lower molecular weight. 164.5 g of this copolymer solution was mixed with 132 g zinc oxide, 2 g Aerosil colloidal silica, 3.5 g bentonite, 1.3 g n-butanol and 3 g xylene to produce a paint of P.V.C. 35 percent.

EXAMPLE 35

104 g ethyl acrylate, 42 g methyl methacrylate and 3 g methacrylic acid were dispersed in 426 g water with 12 g of a 10 percent by weight aqueous solution of ammonium persulphate, 12 g of a 10 percent by weight aqueous solution of sodium metabisulphate and 4 g of a 0.1 percent by weight aqueous solution of ferrous sulphate using 5 g sodium lauryl sulphate. The emulsion was heated to 30° C. to induce the exothermic polymerisation reaction and then held at 80° C. for fifteen minutes before cooling to 25° C. A mixture of the same quantities of monomers, initiator system and surfactant as used above was then added and the reaction mixture was held at 80° C. for one hour to produce a 38.5 percent by volume emulsion of a 70:28:2 by weight copolymer of ethyl acrylate:methyl methacrylate:methacrylic acid.

64.2 g water was mixed with 4.7 g 'Calgon PT' sequestering agent, 19.2 g 'Synperonic N' wetting agent, 5 g Aerosil colloidal silica, 4 g 'Bezaloid 677' defoamer and 31.4 g of a 5 percent by volume aqueous dispersion of a thixotropic agent. 250.5 g cuprous oxide and 236.7 g zinc oxide were dispersed in the aqueous mixture and 374.5 g of the copolymer emulsion was added followed by 50 g ethylene glycol to produce an emulsion paint of P.V.C. 31.5 percent.

EXAMPLE 36

A paint was prepared from the emulsion copolymer of Example 35 using the same procedure except that 16.4 g of the thixotropic agent dispersion was used to replace 16.4 g of the water and the pigments used were 375.8 g cuprous oxide and 118.4 g zinc oxide.

The paints of Examples 12 to 36 were tested in the rotating disc apparatus of FIGS. 7A and 7B of British Pat. No. 1,457,590. In these tests the stripes of paints according to Examples 12 to 36 were applied more thickly (for example at 100 micron dry film thickness) than in the tests on the paints of Examples 1 to 11 and the average thickness of the paint film in each stripe was measured before and after 2 or 4 weeks' rotation in seawater. In each case the rate of dissolution of the paint under test was compared to the rate of dissolution of a commercially successful self-polishing paint (paint X of Examples 1 to 11). This paint has a dissolution rate in service (for example on a tanker trading between the Middle East and Northern Europe) of 8 microns per month. The results obtained are shown in Table 1.

TABLE 1

| Paint of Example No. | Ratio of dissolution rate to that of paint X |
|---|---|
| 12 | 1.62:1 |
| 13 | 0.32:1 |
| 14 | 0.71:1 |
| 15 | 1.03:1 |
| 16 | 0.44:1 |
| 17 | 1.97:1 |
| 18 | 1.29:1 |
| 19 | 0.70:1 |
| 20 | 1.45:1 |
| 21 | 0.56:1 |
| 22 | 0.61:1 |
| 23 | 0.18:1 |
| 24 | 0.47:1 |
| 25 | 0.24:1 |
| 26 | 0.70:1 |
| 27 | 1.00:1 |
| 28 | 0.43:1 |
| 29 | 0.64:1 |
| 30 | 0.63:1 |
| 31 | 0.90:1 |
| 32 | 0.34:1 |
| 33 | 0.32:1 |
| 34 | 1.95:1 |
| 35 | 1.06:1 |
| 36 | 0.75:1 |

All the paints under test dissolved smoothly rather than flaking in a way which would increase the roughness of the paint. Most of the paints dissolved at about the same rate as paint X or somewhat slower indicating that they had a rate of dissolution compatible with both economic use of paint and release of sufficient biocide. The paints of Examples 12, 17, 20 and 34 dissolved somewhat faster than would be desired in commercial practice but could be retarded by the addition of a minor amount of an organic hydrophobic retarder.

The paints of Examples 12 to 26 were tested for antifouling activity by applying each of them to a plaque over a vinyl resin/tar anti-corrosive paint, mounting the plaques on a panel and immersing the panel from a raft in the river Yealm estuary off Southern England between May and September. Each panel also included plaques coated with a non-toxic control (which became heavily fouled with seaweed and some animal life within 4 weeks), three conventional copper based antifouling paints A, B and C and a tin copolymer paint D pigmented with cuprous oxide. Paint A was based on a calcium zinc tall oil fatty acid salt and contained 10 percent by weight cuprous oxide. Paint B was similar but contained some rosin binder and 24 percent by weight cuprous oxide. Paint C was a 2-pack chlorinated rubber antifouling paint containing 41 percent by weight cuprous oxide and 3 percent tributyltin oxide. The antifouling performance of the paints under test is shown in Table 2.

The degree of fouling is rated as follows:
O—no fouling or algal slime
+—no weed or animal fouling but some algal slime
++—no weed or animal fouling but considerable adherent slime
+++—small patches of stunted weed fouling
++++—considerable fouling by stunted weed
+++++—heavy fouling by weed and/or animal

TABLE 2

| Paint of Example No. | No. of weeks immersion | Degree of fouling |
| --- | --- | --- |
| 12 | 16 | 0 |
| 13 | 16 | 0 |
| 14 | 16 | 0 |
| 15 | 16 | 0 |
| 16 | 16 | + |
| 17 | 16 | 0 |
| 18 | 16 | 0 |
| 19 | 16 | + |
| 20 | 16 | + |
| 21 | 11 | 0 |
| 22 | 11 | 0 |
| 23 | 11 | + |
| 24 | 11 | + |
| 25 | 11 | + |
| 26 | 11 | 0 |
| Non-toxic control | 11 or 16 | +++++ |
| Comparison paint A | 16 | ++++ |
| Comparison paint B | 16 | +++ |
| Comparison paint C | 16 | + |
| Comparison paint D | 16 | 0 |

Comparison paints A and B started to show fouling by weed within 8 weeks.

What is claimed is:

1. A marine paint comprising a film-forming acrylic polymer and a metalliferous pigment which is sparingly soluble in seawater, in which the acrylic polymer comprises 20 to 70 percent by weight of monomer units (A) selected from methyl acrylate and ethyl acrylate, 10 to 45 percent by weight of monomer units (B) of a triorganotin salts of an olefinically unsaturated carboxylic acid, and 20 to 50 percent by weight of units (C) which are alkyl methacrylate units having 1 to 4 carbon atoms in the alkyl group or styrene units, provided that if the acrylic polymer is prepared by emulsion polymerisation it contains no more than 40 percent by weight of monomer units (C), the monomer units (A), (B) and (C) forming at least 80 percent by weight of the polymer and the balance of the polymer if any being units of at least one other olefinically unsaturated comonomer.

2. Marine paint according to claim 1 in which the acrylic polymer is prepared using a free radical catalyst in an organic solvent.

3. Marine paint according to claim 1 in which the metalliferous pigment comprises cuprous oxide.

4. Marine paint according to claim 1 in which the metalliferous pigment is selected from mixtures of zinc oxide with cuprous oxide, cuprous thiocyanate and zinc dimethyl dithiocarbamate.

5. Marine paint according to claim 1 in which the polymer includes up to 20 percent by weight maleic anhydride units.

6. Marine paint according to claim 1 in which the polymer includes up to 20 percent by weight acrylamide or methacrylamide units.

7. Marine paint according to claim 1 in which the polymer includes up to 5 percent by weight acrylic acid or methacrylic acid units.

8. Marine paint according to claim 1 in which the monomer units (B) are tributyltin methacrylate units.

9. Marine paint according to claim 1 in which the monomer units (C) are methyl methacrylate units.

10. Marine paint according to claim 1 in which the proportion of pigment to polymer is such as to give a pigment volume concentration of at least 35 percent in the dry paint film.

* * * * *

UNITED STATES PATENT AND TRADEMARK OFFICE
CERTIFICATE OF CORRECTION

PATENT NO. : 4,407,997
DATED : 10/4/83
INVENTOR(S) : Christian M. Sghibartz

It is certified that error appears in the above-identified patent and that said Letters Patent is hereby corrected as shown below:

In column 1, line 10, "rapdily" should be --rapidly--.

In column 3, line 31, "5°-25°" should be --5-25°--.

In column 5, line 47, "planned" should be --planed--.

Signed and Sealed this

Twenty-third Day of October 1984

[SEAL]

Attest:

*Attesting Officer*

GERALD J. MOSSINGHOFF
*Commissioner of Patents and Trademarks*